(12) United States Patent
Aizawa

(10) Patent No.: US 9,425,594 B2
(45) Date of Patent: Aug. 23, 2016

(54) WIRING HARNESS AND RELAY HARNESS

(71) Applicants: AutoNetworks Technologies, Ltd., Yokkaichi, Mie (JP); Sumitomo Wiring Systems, Ltd., Yokkaichi, Mie (JP); SUMITOMO ELECTRIC INDUSTRIES, LTD., Osaka (JP)

(72) Inventor: Takeshi Aizawa, Yokkaichi (JP)

(73) Assignees: AUTONETWORKS TECHNOLOGIES, LTD. (JP); SUMITOMO WIRING SYSTEMS, LTD. (JP); SUMITOMO ELECTRIC INDUSTRIES, LTD. (JP)

( * ) Notice: Subject to any disclaimer, the term of this patent is extended or adjusted under 35 U.S.C. 154(b) by 0 days.

(21) Appl. No.: 14/285,698

(22) Filed: May 23, 2014

(65) Prior Publication Data

US 2014/0345936 A1    Nov. 27, 2014

(30) Foreign Application Priority Data

May 24, 2013    (JP) .................................. 2013-110189

(51) Int. Cl.
*H02G 3/04*    (2006.01)
*H01R 13/527*    (2006.01)
*H01R 31/06*    (2006.01)

(52) U.S. Cl.
CPC .......... *H02G 3/0412* (2013.01); *H01R 13/527* (2013.01); *H01R 31/06* (2013.01); *H01R 2201/26* (2013.01)

(58) Field of Classification Search
CPC  H01R 4/021; H01R 13/5216; H01R 13/504; H01R 13/527; H01R 13/521; H01R 13/5219; H01R 13/6273; H01R 31/06; H01R 12/778; H01R 24/28; H01R 24/20; H01R 4/04; H01B 7/0045; H01B 7/295; H01B 13/06; H01B 7/285; C08K 5/01; C08K 5/521; C08L 71/126; C08L 71/12; C08L 53/025; C08L 81/02
USPC ................. 174/72 A, 137 A, 88 R, 84 R, 76; 439/271, 178, 936, 86, 588, 519; 264/408, 277, 230, 104
See application file for complete search history.

(56) References Cited

U.S. PATENT DOCUMENTS

| | | | |
|---|---|---|---|
| 4,051,383 A * | 9/1977 | Dola ............................... | 307/11 |
| 4,941,844 A * | 7/1990 | Bowden ............... | H01R 4/2412 439/35 |
| 5,006,286 A * | 4/1991 | Dery ........................ | H01R 4/04 174/76 |
| 8,653,365 B1 * | 2/2014 | Mixon ........................ | 174/71 R |
| 2002/0081884 A1 * | 6/2002 | Asai ..................... | H01R 23/667 439/260 |

(Continued)

*Primary Examiner* — Timothy Thompson
*Assistant Examiner* — Guillermo Egoavil
(74) *Attorney, Agent, or Firm* — Gerald E. Hespos; Michael J. Porco; Matthew T. Hespos

(57) ABSTRACT

A relay harness (30) connects a first harness (10) and a second harness (20). The relay harness (30) includes relay wires (31) and first and second housings (36, 37) connected to ends of the relay wires (31). Each relay wire (31) has a third conductor (32) surrounded by a third coating (33). The first housing (36) is configured to connect to a first connector (16) of the first harness (10). The second housing (37) is configured to connect to a second connector (26) of the second harness (20). A coating resin for the third insulation coatings (33) and a housing resin for the first and second housings (36, 37) are synthetic resins having a higher flame retardancy than a resin material for the first harness (10).

7 Claims, 8 Drawing Sheets

(56) References Cited

U.S. PATENT DOCUMENTS

| | | | |
|---|---|---|---|
| 2003/0115989 A1 | 6/2003 | Katsumata et al. | |
| 2007/0048524 A1* | 3/2007 | Hase | 428/375 |
| 2009/0183893 A1* | 7/2009 | Kambe | 174/110 R |
| 2011/0053398 A1* | 3/2011 | Arai | H01B 7/285 |
| | | | 439/271 |
| 2011/0079428 A1* | 4/2011 | Nonaka | 174/72 A |
| 2011/0180301 A1* | 7/2011 | Basfar et al. | 174/110 SR |
| 2012/0100752 A1* | 4/2012 | Ooki | C08L 53/025 |
| | | | 439/588 |
| 2012/0149243 A1* | 6/2012 | Ohnishi | H01R 43/24 |
| | | | 439/626 |
| 2012/0225227 A1* | 9/2012 | Radosta | B65D 81/343 |
| | | | 428/35.2 |
| 2014/0170900 A1* | 6/2014 | Ishii | H01R 13/527 |
| | | | 439/519 |

* cited by examiner

WIRING HARNESS AND RELAY HARNESS

BACKGROUND

1. Field of the Invention

The invention relates to a wiring harness and a relay harness.

2. Description of the Related Art

Japanese Unexamined Patent Publication No. 2003-263930 discloses a wiring harness that uses non-halogen flame-retardant resin as a coating material that surrounds wires. This coating material ensures that the wiring harness coating does not define a spreading path for combustion during a vehicle fire.

All members of a wiring harness preferably are coated with flame-retardant resin to prevent the spread of fire in the event of a vehicle fire. However, non-halogen flame-retardant resin is more expensive than the PCV resin that is used widely as general-purpose coating. In addition, the length of wiring harnesses in an automotive vehicle and the number of wires of the wiring harness have increased in recent years. Thus, costs increase if members of the wiring harness are coated with flame-retardant resin.

Consideration has been given to applying flame-retardant coatings only to areas of the wiring harness near a device with a possibility of a fire. Thus, the spread of fire along the coating members can be suppressed to a minimum. This approach requires a structure to set only a part of the wiring area as the flame-retardant area. For example, wires in an easily flammable area use a coating with a lower flash point than wires in the flame-retardant area, and these wires are fixed, such as by crimping a sleeve-type connection terminal. The connected part then is taped to be insulated from other wires. However, a process of connecting the wires in the flame-retardant area and those in the easily flammable area using the connection terminal and the tape is performed manually by an operator, and a burden on the operator is large when the number of the wires of the wiring harness is large.

The invention was completed based on the above situation and aims to reduce a burden on an operator in the manufacturing of a wiring harness in which a part of a wiring area is a flame-retardant area.

SUMMARY OF THE INVENTION

The invention relates to a wiring harness with a harness structure that has a first connector on a plurality of conductive paths. A relay harness is wired between the first connector and a second connector in a circuit structure. The wiring harness also has a relay harness with relay wires formed so that a conductor is surrounded by a coating member. The relay harness includes first and second housings. The first housing is connected to the first connector and connects the relay wires to the conductive paths. The second housing of the relay harness is connected to the second connector and connects the relay wires to the circuit structure. At least one of a coating resin for the coating members and a housing resin for the first and second housings is synthetic resin has a higher flame retardancy than a resin material used for the conductive paths.

The wiring harness may be configured to include the circuit structure, and the circuit structure may be formed so that the second connector is provided on ends of a plurality of harness wires. Accordingly, the wiring harness including the harness structure, the relay harness and the circuit structure is formed if the first housing is connected to the first connector and the second housing is connected to the second connector. The circuit structure is in the form of a harness. Thus, the flame-retardant area formed by the relay harness can be set in a wiring direction of the wiring harness by appropriately setting wiring lengths of the harness structure and the circuit structure.

The first housing may have the same shape as the second connector; and/or the second housing may have the same shape as the first connector. Accordingly, mold costs can be suppressed because plural housings can be produced by the same mold.

The circuit structure may be a device to be fixed in a vehicle. Accordingly, the relay harness can inhibit the spread of fire from the device by being wired at a position of the wiring harness closest to the device.

A coating resin material for the relay wires and a housing resin material of the first and/or second housing may include synthetic resin materials that are of a non-halogen type and/or that have higher flash point and/or ignition point than the synthetic resin material of a first insulation coating of the of conductive paths and/or of a second insulation coating of the circuit structure and/or may be self-extinguishable.

The synthetic resin material having a high flame retardancy may be obtained by adding non-halogen flame retardant or metal oxide to olefin-based resin as a base.

The invention also relates to a relay harness that is part of a wiring harness. The relay harness has relay wires, each of which has a conductor surrounded by a coating. The relay harness has a first housing to connect the relay wires to conductive paths of the wiring harness by connecting to a first connector of the wiring harness. The relay harness further has a second housing to connect the relay wires to a circuit structure by connecting to a second connector of the wiring harness. At least one of a coating resin material for the coating members of the relay wires and a housing resin material for the first and/or second housings of the relay harness is synthetic resin with a higher flame retardancy than a resin used for the conductive paths of the wiring harness.

The circuit structure may be a device in a vehicle and the relay harness may be near the device. Accordingly, the relay harness inhibits the spread of a fire that breaks from the device.

These and other features and advantages of the invention will become more apparent upon reading of the following detailed description of preferred embodiments and accompanying drawings.

DETAILED DESCRIPTION OF THE PREFERRED EMBODIMENTS

A first embodiment of the invention is described with reference to FIGS. 1 to 6. A wiring harness A of this embodiment is formed by connecting a first harness 10, a second harness 20 and a relay harness 30.

Figure 1:
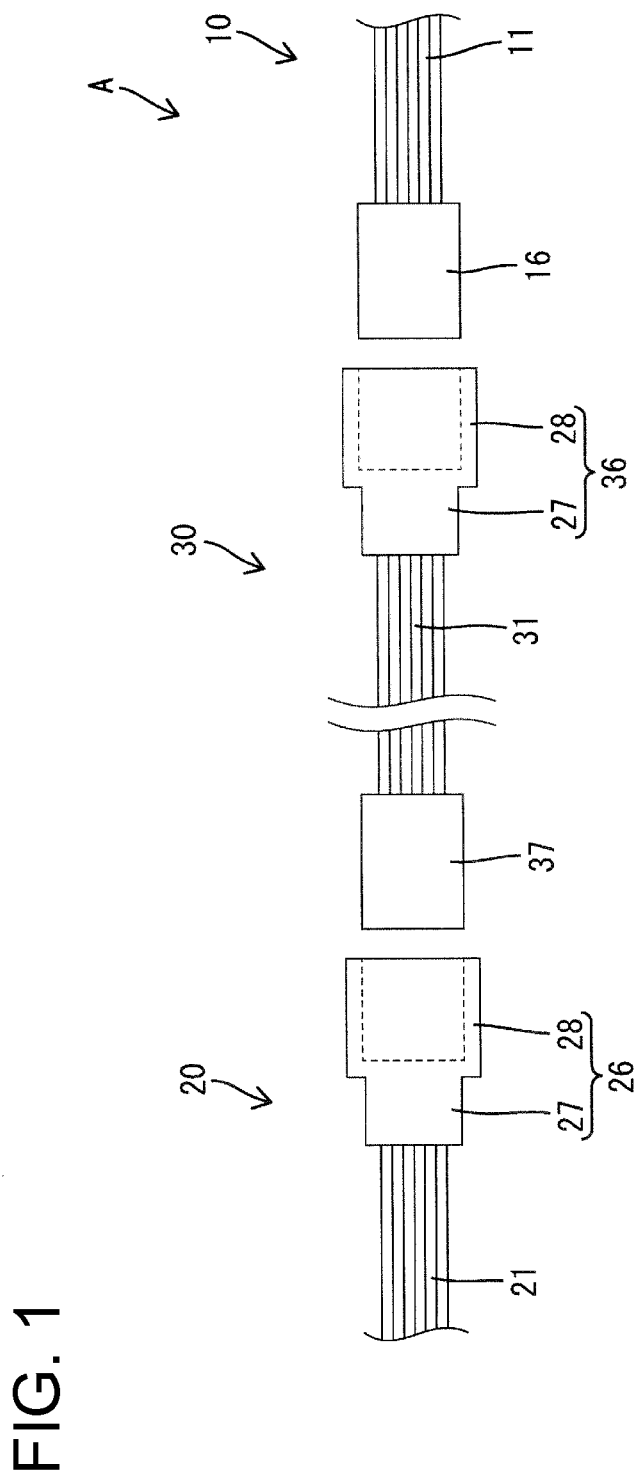
FIG. 1 is a schematic diagram showing a wiring harness divided into a first harness, a second harness and a relay harness.
Figure 2:
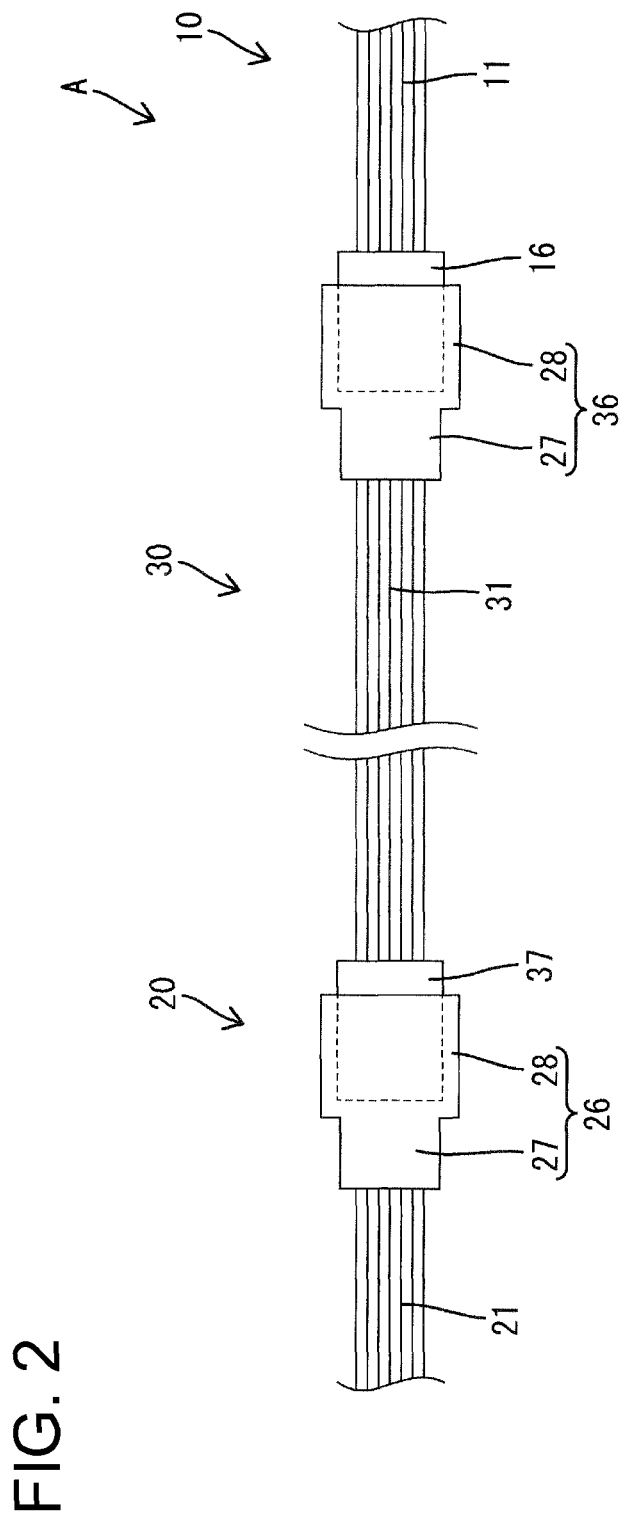
FIG. 2 is a schematic diagram showing the first harness, the second harness and the relay harness are connected to form the wiring harness.
Figure 3:
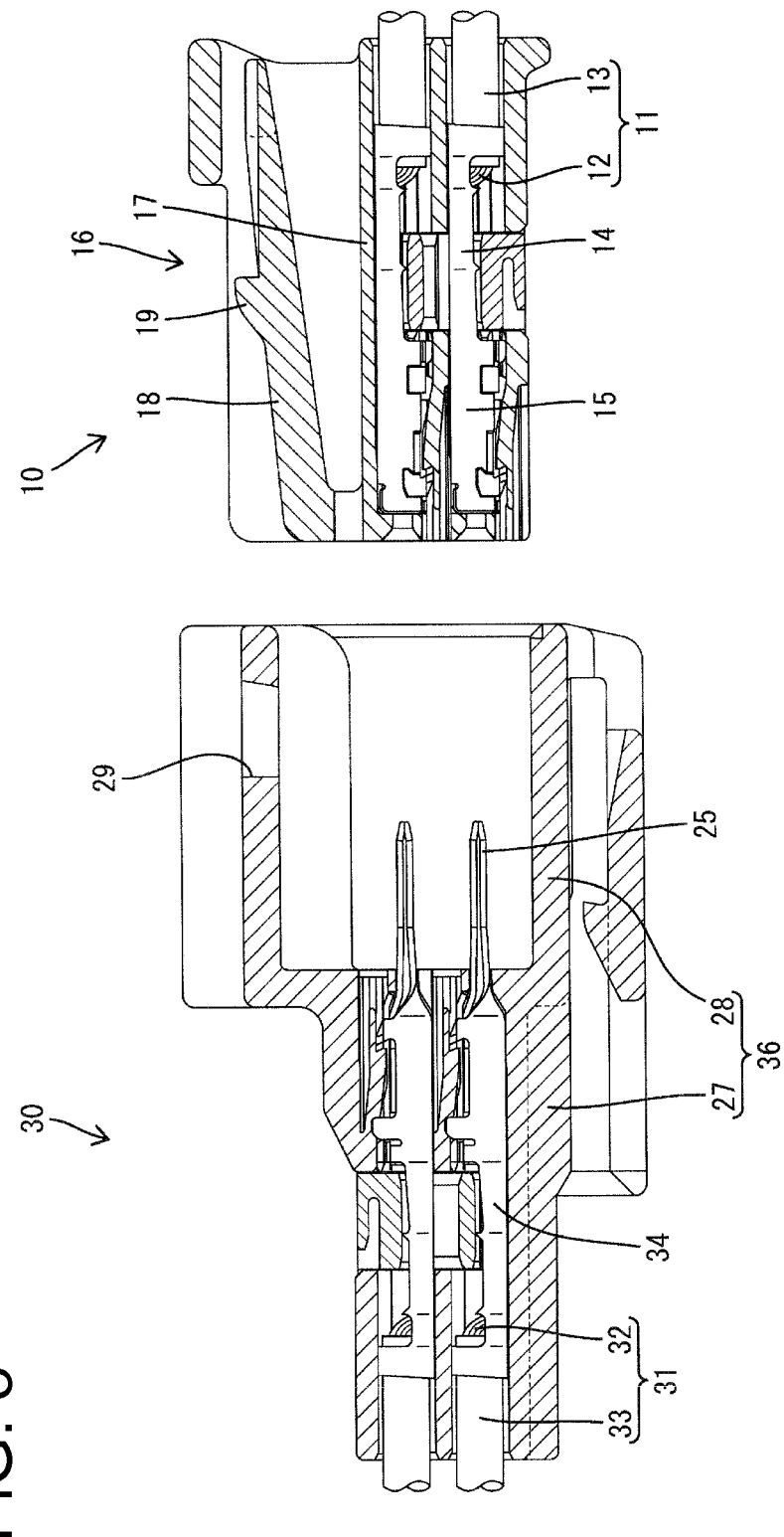
FIG. 3 is a section showing a first connector and a first housing separated.
Figure 5:
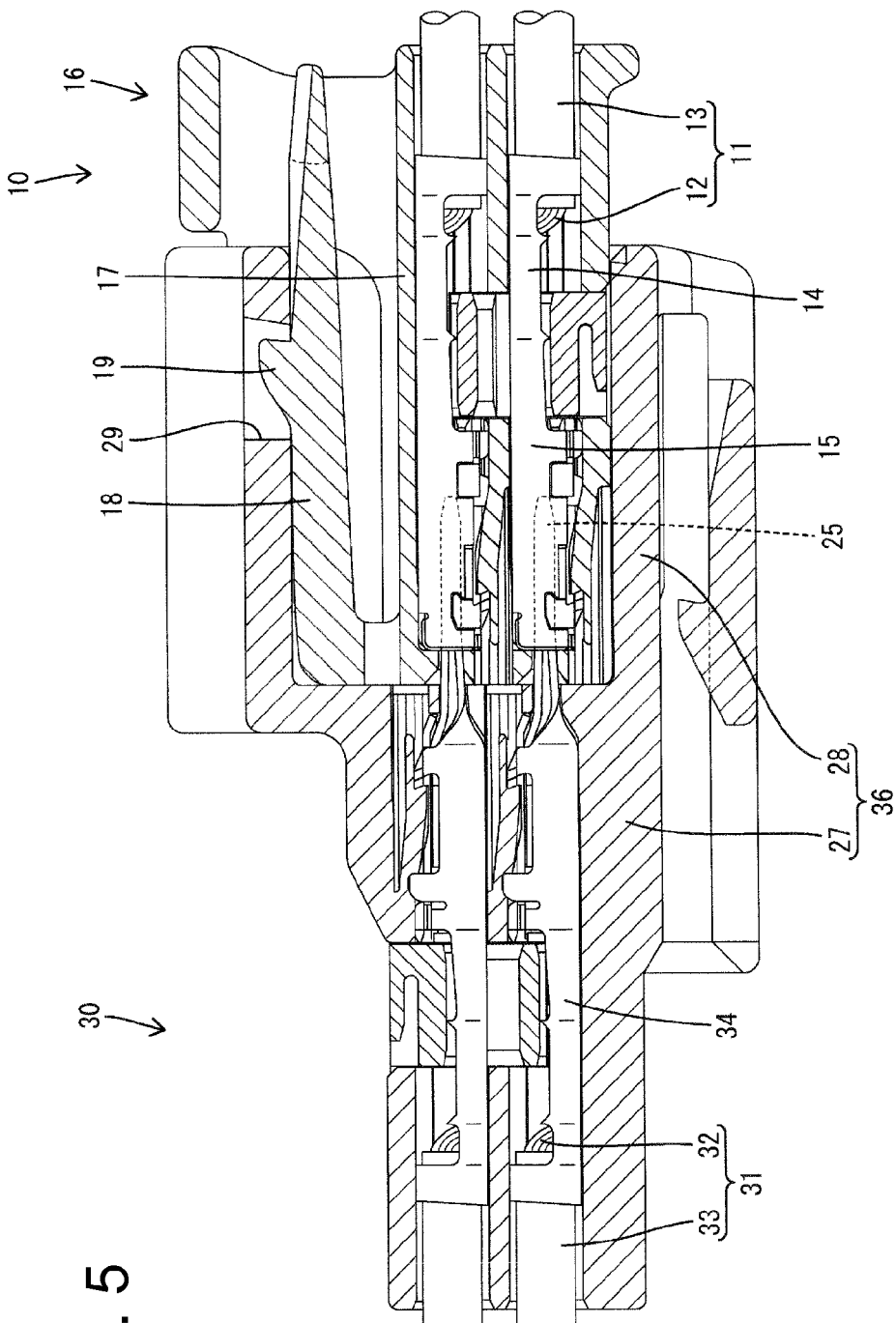
FIG. 5 is a section showing the first connector and the first housing connected.

The first harness 10 includes a bundle of first wires 11 and a first connector 16 mounted on one end (left end in FIGS. 1 and 2) of the bundle of the first wires 11. As shown in FIGS. 3 and 5, each first wire 11 has a first conductor 12 surrounded by a first insulation coating 13. A first terminal fitting 14 is connected to an end of each first wire 11. The first terminal fitting 14 is a female terminal with a substantially rectangular tube 15. A terminal fitting having substantially the same shape as a second terminal fitting 24 to be described later is connected to the other end (not shown) of the first wire 11.

The first connector 16 is made unitarily e.g. of synthetic resin to define a substantially block-shaped terminal accommodating portion 17 and a resiliently deformable lock arm 18 extending along an outer surface of the terminal accommodating portion 17. The first terminal fittings 14 are to be inserted and held in the terminal accommodating portion 17. The lock arm 18 has a lock projection 19 engageable with a lock hole 29.

Figure 4:
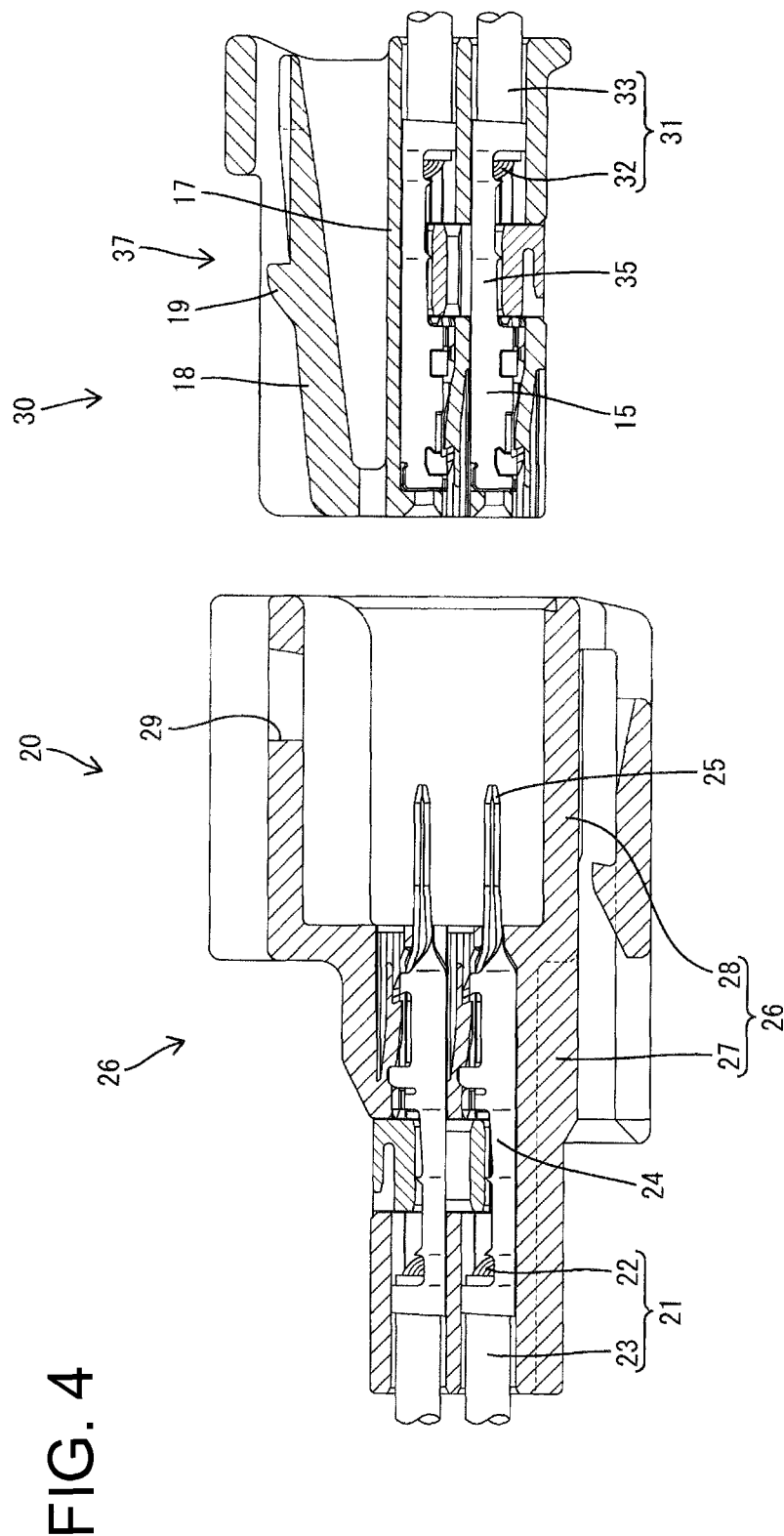
FIG. 4 is a section showing a second connector and a second housing separated.
Figure 6:
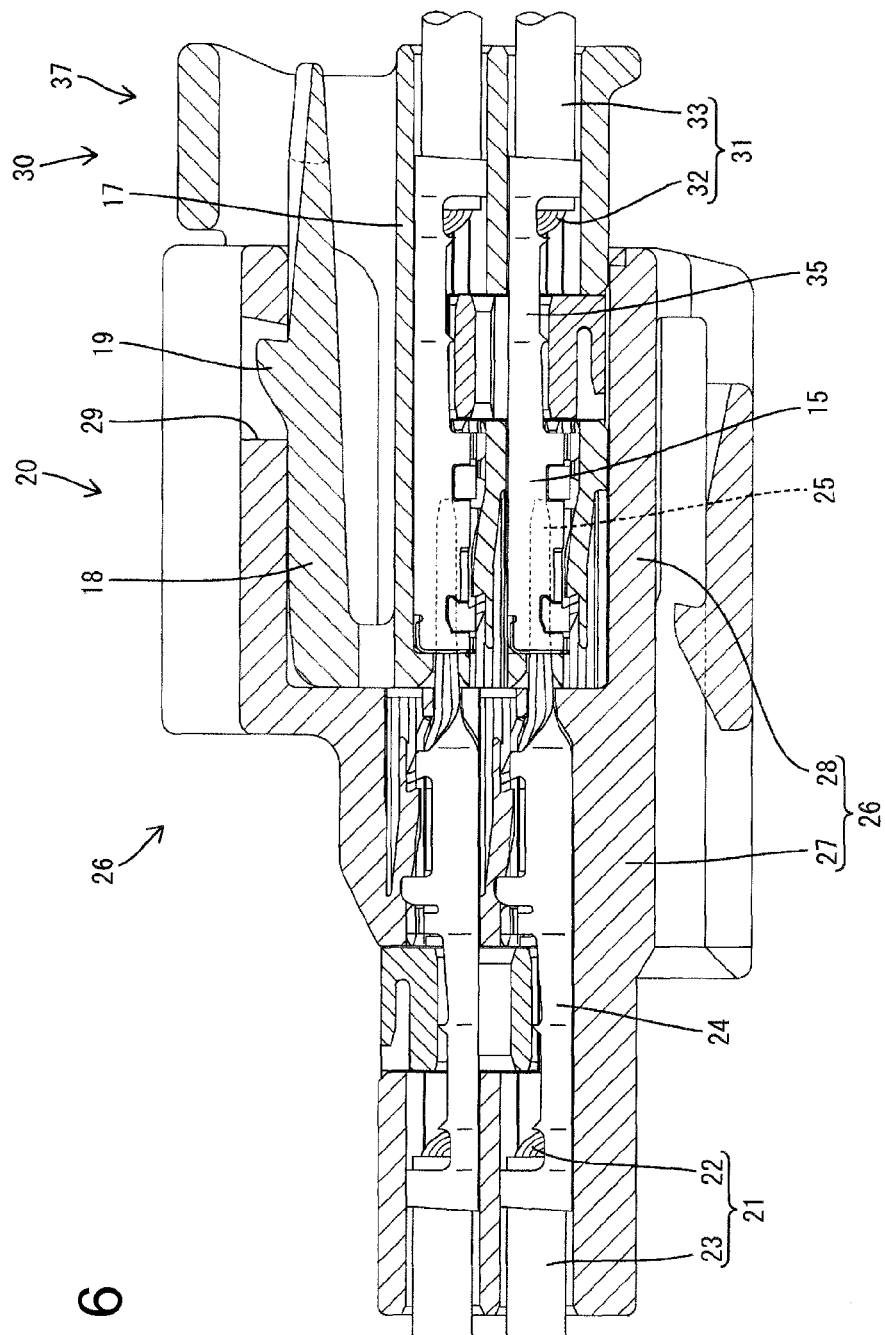
FIG. 6 is a section showing the second connector and the second housing connected.

The second harness 20 includes a bundle of second wires 21 and a second connector 26 mounted on one end (right end in FIGS. 1 and 2) of the bundle of the second wires 21. As shown in FIGS. 4 and 6, each second wire 21 has a second conductor 22 surrounded by a second insulation coating 23. A second terminal fitting 24 is to be connected to an end of the second wire 21. The second terminal fitting 24 is a male terminal with a long and narrow tab 25 on a front end part. A terminal fitting having the substantially same shape as the first terminal fitting 14 described above is connected to the other end (not shown), of the second wire 21.

The second connector 26 is made unitarily e.g. of synthetic resin to include a terminal holding portion 27 and a receptacle 28 projecting forward from the terminal holding portion 27. Areas of the second terminal fittings 24 other than the tabs 25 are to be inserted and held in the terminal holding portion 27. The tabs 25 of the second terminal fittings 24 collectively are surrounded by the receptacle 28. Further, a lock hole 29 is formed in a wall forming the receptacle 28.

Relatively inexpensive soft polyvinyl chloride (PVC) preferably is used for the first and second insulation coatings 13, 23. This soft PVC is self-extinguishable, but has an ignition point of about 454° C. Thus, there is a possibility of spreading fire if a high atmospheric temperature at the time of burning continues. Polybutylene terephthalate (PBT) with enhanced flame retardancy is used as a synthetic resin for the first and second connectors 16, 26. PBT also is self-extinguishable, but has a relatively low ignition point of about 300° C. Thus, there is a possibility of spreading fire if a high atmospheric temperature at the time of burning continues.

The relay harness 30 includes a bundle of relay wires 31, a first housing 36 mounted on one end of this bundle of the relay wires 31 and a second housing 37 mounted on the other end of the bundle of the relay wires 31. Each relay wire 31 has a third conductor 32 surrounded by a third insulation coating 33. A first relay terminal 34 is connected to one end (right end in FIGS. 1 to 3 and 5) of each relay wire 31. As shown in FIGS. 3 and 5, the first relay terminal 34 is of substantially the same type as the second terminal fitting 24, i.e. a male terminal with a long and narrow tab 25 on a front end part. A second relay terminal 35 is connected to the other end part of the relay wire 31. As shown in FIGS. 4 and 6, the second relay terminal 35 is of substantially the same type as the first terminal fitting 14, i.e. a female terminal with rectangular tube 15 on a tip part. A resilient contact piece (not shown) is accommodated in the rectangular tube 15.

The first housing 36 is made unitarily e.g. of synthetic resin and has substantially the same shape and dimensions as the second connector 26. Specifically, the first housing 36 is molded by the same mold as a mold (not shown) for molding the second connector 26. As shown in FIGS. 3 and 5, the first housing 36 has a terminal holding portion 27 and a receptacle 28 projecting forward from the terminal holding portion 27. Areas of the first relay terminals 34 other than the tabs 25 are inserted and held in the terminal holding portion 27. The tabs 25 of the first relay terminals 34 are surrounded collectively by the receptacle 28. The lock hole 29 is formed in a wall of the receptacle 28.

The second housing 37 is made unitarily e.g. of synthetic resin to have substantially the same shape and dimensions as the first connector 16. Specifically, the second housing 37 is molded by the same mold as a mold (not shown) for molding the first connector 16. As shown in FIGS. 4 and 6, the second housing 37 has a substantially block-shaped) terminal accommodating portion 17 and a resiliently deformable lock arm 18 extends along the outer surface of the terminal accommodating portion 17. The second relay terminals 35 are inserted and held in the terminal accommodating portion 17. The lock arm 18 has a lock projection 19 engageable with the lock hole 29.

Synthetic resins having a higher flame retardancy than the synthetic resins for the first and second insulation coatings 13, 23 and the first and second connectors 16, 26 are used for the third insulation coatings 33 of the relay wires 31 and a housing resin material for the first and second housings 36, 37. Specific examples of the coating resin material for the relay wires 31 and the housing resin material include synthetic resins of a non-halogen type having higher flash point and/or ignition point than the synthetic resin of the first and second insulation coatings 13, 23 and are self-extinguishable. A resin material obtained by adding non-halogen flame retardant or metal oxide to olefin-based resin as a base can be used as the synthetic resin having a high flame retardancy.

In assembling the wiring harness A, the first harness 10 and the relay harness 30 are connected by connecting the first connector 16 of the first harness 10 and the first housing 36 of the relay harness 30. Additionally, the relay harness 30 and the second harness 20 are connected by connecting the second housing 37 of the relay harness 30 and the second connector 26 of the second harness 20. Thus, the wiring harness A is formed with the first and second harnesses 10, 20 connected via the relay harness 30.

In the process of connecting the first connector 16 and the first housing 36, the first connector 16 is fit into the receptacle 28 of the first housing 36. Thus, the lock projection 19 interferes with the receptacle 28 to deform the lock arm 18 resiliently. When the first connector 16 and the first housing 36 reach a properly connected state, the lock arm 18 is resiliently at least partly restored, the lock projection 19 is engaged with the lock hole or recess 29 and the first connector 16 and the first housing 36 are locked in the properly connected state as shown in FIG. 5. Further, when the first connector 16 and the first housing 36 are connected, the tabs 25 of the first terminal fittings 14 are inserted into the substantially rectangular tubes 15 of the first relay terminals 34 and the resilient contact pieces (not shown) provided in the substantially rectangular tubes 15 and the tabs 25 resiliently contact each other so that the first terminal fittings 14 and the first relay terminals 34 are connected electrically.

The second housing 37 is fit into the receptacle 28 of the second connector 26 and the lock projection 19 interferes with the receptacle 28 to deform the lock arm 18 in the process of connecting the second connector 26 and the second housing 37. The lock arm 18 restores resiliently when the second connector 26 and the second housing 37 reach a properly connected state. Thus, the lock projection 19 engages the lock hole 29 and the second connector 26 and the second housing 37 are locked in the properly connected state, as shown in FIG. 6. Further, when the second connector 26 and the second housing 37 are connected, the tabs 25 of the second relay terminals 35 are inserted into the substantially rectangular tubes 15 of the second terminal fittings 24 and the resilient contact pieces (not shown) at the substantially rectangular tubes 15 and the tabs 25 resiliently contact each other. Thus, the second terminal fittings 24 and the second relay terminals 35 are connected electrically.

Note that the first connector 16 and the second housing 37 are components having the same shape and dimensions, and/or the second connector 26 and the first housing 36 are components having the same shape and dimensions. The first terminal fittings 14 and the second relay terminals 35 have substantially the same shape and dimensions, and/or the second terminal fittings 24 and the first relay wires 34 have substantially the same shape and dimensions. Thus, the first connector 16 and the second connector 26 can be connected to each other. When the two connectors 16, 26 are connected, the first and second terminal fittings 14, 24 are connected and the first harness 10 and the second harness 20 are directly connected. Further, the first and second housings 36, 37 can also be connected to each other. When the two housings 36, 37 are connected, the first and second relay terminals 34, 35 are connected to each other.

As described above, the wiring harness A of the first embodiment includes the first harness 10 with the first connector 16 provided on end parts of the plurality of first wires 11, the second housing 20 with the second connector 26 provided on end parts of the plurality of second wires 21, and the relay harness 30 wired between the first and second connectors 16, 26. The relay harness 30 includes the relay wires 31 with the third conductor 32 coated with the third insulation coating 33. The first housing 36 is arranged on the end parts of the relay wires 31, and the second housing 37 is arranged on the end parts of the relay wires 31, and the coating resin material for the third insulation coatings 33 and the housing resin material for the first and second housings 36, 37 are both made of flame-retardant synthetic resin. The wiring harness A is so configured that the flame-retardant area formed by the relay harness 30 is provided between the first and second harnesses 10, 20 as just described, the spread of fire can be suppressed in the housings 36, 37 of the relay harness 30 even if fire caused by the burning of the coating members of the first harness 10 or the second housing 20 spreads in a spreading path.

The first housing 36 constituting or forming part of the relay harness 30 is to be connected to the first connector 16, whereby the end parts (first relay terminals 34) of the relay wires 31 on one side can be connected to the first terminal fittings 14 of the first wires 11. The second housing 37 constituting or forming part of the relay harness 30 is to be connected to the second connector 26, whereby the end parts (second relay terminals 35) of the relay wires 31 on the other side can be connected to the second terminal fittings 24 of the second wires 21. Thus, a manual operation required in the manufacturing of the wiring harness A of the first embodiment particularly includes only an operation of connecting the first housing 36 and the first connector 16 and an operation of connecting the second housing 37 and the second connector 26, wherefore a burden on the operator can be reduced.

Further, since the wiring harness A of the first embodiment particularly is so wired that the relay harness 30 serving as the flame-retardant area is interposed between the first and second harnesses 10, 20, the flame-retardant area formed by the relay harness 30 can be appropriately set in a wiring direction of the wiring harness A particularly by appropriately setting a wiring length of the first harness 10 and that of the second harness 20.

Further, since the first housing 36 and the second connector 26 particularly have the same shape, they can be produced by the same mold. Thus, mold cost can be suppressed as compared with the case where the first housing 36 and the second connector 26 have different shapes. Similarly, since the second housing 37 and the first connector 16 particularly may (also) have the same shape, they can also be produced by the same mold. Thus, mold cost can be suppressed as compared with the case where the second housing 37 and the first connector 16 have different shapes.

Figure 7:
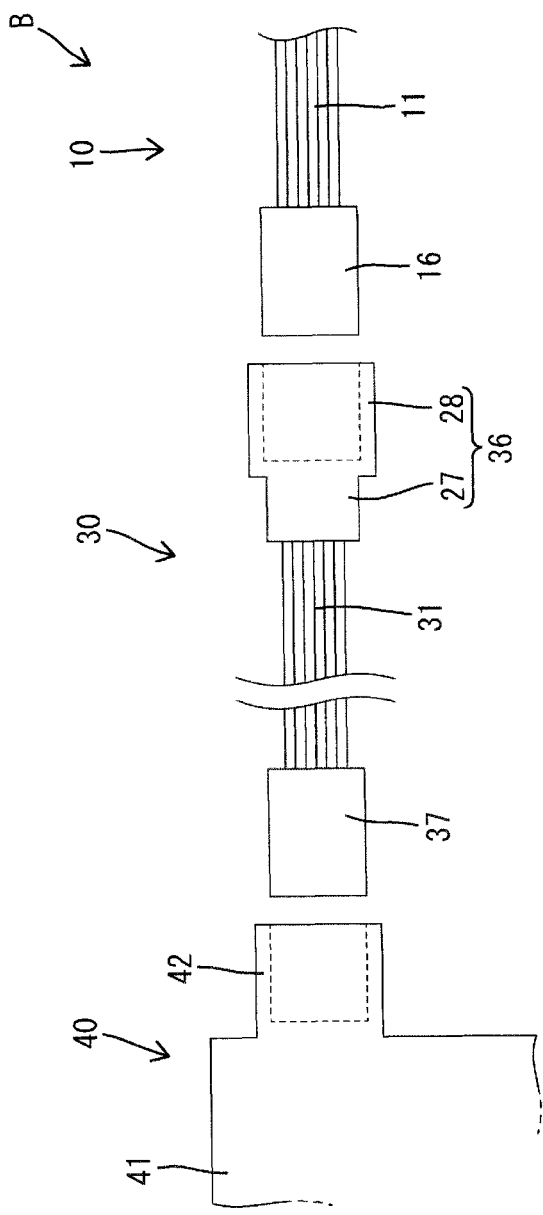
FIG. 7 is a schematic diagram showing a wiring harness removed from a device and a first harness and a relay harness are separated in a second embodiment.
Figure 8:
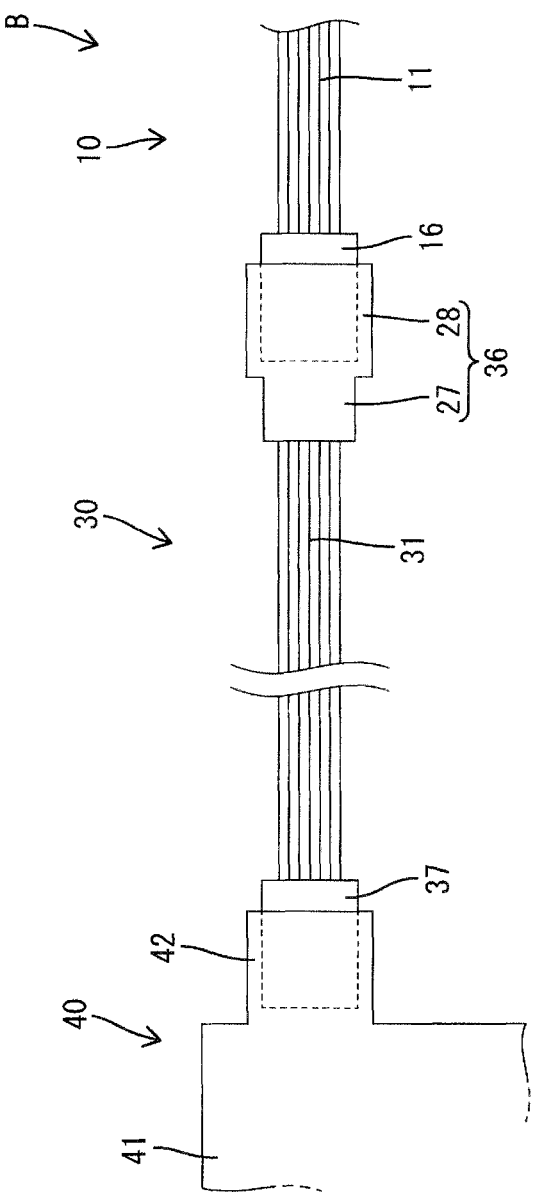
FIG. 8 is a schematic diagram showing a state where the first harness and the relay harness are connected to form the wiring harness and the wiring harness is connected to the device.

Next, a specific second embodiment of the present invention is described with reference to FIGS. 7 and 8. The wiring harness A of the first particular embodiment is configured by wiring the relay harness 30 between the first and second harnesses 10, 20, whereas a wiring harness B of the second particular embodiment is configured by wiring a relay harness 30 between a first harness 10 and a device 40 (as a particular circuit structure). The wiring harness B of the second embodiment is composed of or comprises the first harness 10 and the relay harness 30, and the device 40 particularly does not constitute or form part of the wiring harness B of the second embodiment.

The first harness 10 of the second embodiment particularly has the substantially same configuration as the first harness 10 of the first embodiment and/or the relay harness 30 of the second embodiment particularly has the substantially same configuration as the relay harness 30 of the first embodiment. Thus, structures, functions and effects are not described for the substantially same configurations.

The device 40 is a device to be fixedly provided in an automotive vehicle such a power distributor, a junction box and/or a battery. A second connector 42 particularly is integrally or unitarily formed in a casing 41 of the device 40. The second connector 42 is connected to a second housing 37 of the relay harness 30. A part (receptacle-shaped part) of the second connector 42 to be connected to the second housing 37 particularly has the substantially same configuration as the second connector 26 of the first embodiment. Second terminal fittings (not shown) connected to circuits (not shown) of the device 40 particularly are held in the second connector 42 of the second embodiment. The second terminal fittings of the second embodiment particularly are of the substantially same type as the second terminal fittings 24 of the first embodiment.

In the wiring harness B of the second embodiment, the relay harness 30 serving as a flame-retardant area particularly is directly fitted and connected to the second connector 42 of the device 40. Thus, if a fire should break from the device 40, the spread of fire can be inhibited in the flame-retardant area formed by the relay harness 30 wired at a position of the wiring harness B closest to the device 40. That is, the spread of fire to the first harness 10 of the wiring harness B can be prevented.

The invention is not limited to the above described embodiments. For example, the following embodiments also are included in the scope of the invention.

The first housing and the second connector have the same shape in the first embodiment, but they may have different shapes.

The second housing and the first connector have the same shape in the first and second embodiments, but they may have different shapes.

The first and second connectors are shaped to be connectable to each other in the first and second embodiments, but they need not be connectable to each other.

The first and second housings are shaped to be connectable to each other in the first and second embodiments, but they need not be connectable to each other.

Although the first and second housings have different shapes in the first and second embodiments, they may have the same shape.

Although the first and second connectors have different shapes in the first embodiment, they may have the same shape.

Both the coating resin material and the housing resin material are flame-retardant synthetic resins in the first and second embodiments. However, the coating resin material may be flame-retardant synthetic resin and the housing resin material may be flammable synthetic resin or the coating resin material may be flammable synthetic resin and the housing resin material may be flame-retardant synthetic resin.

The coating resin material is flame-retardant synthetic resin and the housing resin material also is flame-retardant synthetic resin in the first and second embodiments. However, the housing resin material of one of the first and second housings may be flammable and the housing resin material of the other housing may be flame-retardant synthetic resin if the coating resin material is flame-retardant synthetic resin.

The plurality of relay wires of the relay harness are bundled into one and one first housing and one second housing are provided in the first and second embodiments. However, the bundle of the relay wires may be branched off at intermediate positions and a plurality of first housings or a plurality of second housings may be provided.

The first wires, the relay wires and the second wires are non-shielded wires in the first embodiment. However, the invention also can be applied where the first wires, the relay wires and the second wires are shielded wires.

The first wires and the relay wires are non-shielded wires in the second embodiment. However, the invention can also be applied in the case where the first wires and the relay wires are shielded wires.

What is claimed is:

1. A wiring harness, comprising:
   a first harness provided with a first connector on a plurality of first wires, the first wires formed such that each first wire has a first conductor surrounded by a first insulation coating;
   a second harness provided with a second connector on a plurality of second wires, the second wires formed such that each second wire has a second conductor surrounded by a second insulation coating;
   a relay harness wired between the second connector and the first connector,
   the relay harness having relay wires formed such that each relay wire has a conductor surrounded by a coating resin,
   the relay harness further having a first housing composed of a first housing resin and configured to connect to the first connector for connecting the relay wires to the first wires, and having a second housing composed of a second housing resin and configured to connect to the second connector for connecting the relay wires to the second wires;
   wherein the coating resin, the first housing resin, and the second housing resin includes non-halogen type synthetic resins that (A) have a higher ignition points than a resin material used for the first insulation coating and the second insulation coating; and/or (B) are self-extinguishable.

2. The wiring harness of claim 1, wherein:
   the first housing and the second connector are shaped identically; and the second housing and the first connector are shaped identically.

3. The wiring harness of claim 1, wherein:
   the wiring harness is a fixedly provided in a vehicle.

4. The wiring harness of claim 1, wherein the non-halogen type synthetic resins comprise an olefin-based resin and a non-halogen flame retardant or a metal oxide.

5. A wiring harness, comprising:
   a first harness provided with a first connector on a plurality of first wires, the first wires formed such that each first wire has a first conductor surrounded by a first insulation coating;
   a second harness provided with a second connector on a plurality of second wires, the second wires formed such that each second wire has a second conductor surrounded by a second insulation coating;
   a relay harness wired between the second connector and the first connector,
   the relay harness having relay wires formed such that each relay wire has a conductor surrounded by a coating resin,
   the relay harness further having a first housing composed of a first housing resin and configured to connect to the first connector for connecting the relay wires to the first wires, and having a second housing composed of a second housing resin and configured to connect to the second connector for connecting the relay wires to the second wires; wherein:
   at least one of the coating resin, the first housing resin, and the second housings resin is a synthetic resin having a higher flame retardancy than a resin material used for the first insulation coating;
   the first connector is composed of a first connector synthetic resin;
   wherein the second connector is composed of a second connector synthetic resin; and
   the coating resin, the first housing resin, and the second housing resin include non-halogen type synthetic resins that have higher ignition points than the first insulation coating, the second insulation coating, the first connector synthetic resin, and the second connector synthetic resin.

6. A wiring harness, comprising:
   a first harness provided with a first connector on a plurality of first wires, the first wires formed such that each first wire has a first conductor surrounded by a first insulation coating;

a second harness provided with a second connector on a plurality of second wires, the second wires formed such that each second wire has a second conductor surrounded by a second insulation coating;

a relay harness wired between the second connector and the first connector, the relay harness having relay wires formed such that each relay wire has a conductor surrounded by a coating resin, the relay harness further having a first housing composed of a first housing resin and configured to connect to the first connector for connecting the relay wires to the first wires, and having a second housing composed of a second housing resin and configured to connect to the second connector for connecting the relay wires to the second wires; wherein:

at least one of the coating resin, the first housing resin, and the second housing resin is a synthetic resin having a higher flame retardancy than a resin material used for the first insulation coating;

the first connector and the second connector are composed of polybutylene terephthalate;

the first and second insulation coatings are composed of polyvinyl chloride; and the coating resin, the first housing resin, and/or the second housing resin include a non-halogen type synthetic resin that has a higher ignition point than polybutylene terephthalate and polyvinyl chloride.

7. The wiring harness of claim 1 further comprising a flame-retardant area between the first and second harnesses formed by the relay harness.

\* \* \* \* \*